US012562135B2

(12) United States Patent
Lee et al.

(10) Patent No.: US 12,562,135 B2
(45) Date of Patent: Feb. 24, 2026

(54) DISPLAY DEVICE AND OPERATING METHOD THEREOF

(71) Applicant: LG ELECTRONICS INC., Seoul (KR)

(72) Inventors: Wonki Lee, Seoul (KR); Seho Jeong, Seoul (KR); Sunwoo Jung, Seoul (KR); Kyuyong Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/752,242

(22) Filed: Jun. 24, 2024

(65) Prior Publication Data

US 2025/0316246 A1 Oct. 9, 2025

(30) Foreign Application Priority Data

Apr. 9, 2024 (KR) ........................ 10-2024-0047724

(51) Int. Cl.
*G09G 3/34* (2006.01)

(52) U.S. Cl.
CPC ... *G09G 3/3426* (2013.01); *G09G 2320/0233* (2013.01); *G09G 2320/066* (2013.01)

(58) Field of Classification Search
CPC ......... G09G 3/3426; G09G 2320/0233; G09G 2320/066
See application file for complete search history.

(56) References Cited

U.S. PATENT DOCUMENTS

| | | | | |
|---|---|---|---|---|
| 2005/0068332 | A1* | 3/2005 | Diefenbaugh | H04N 1/6027 345/604 |
| 2011/0141077 | A1* | 6/2011 | Cho | G09G 3/3426 345/207 |
| 2016/0035264 | A1* | 2/2016 | Fujii | G09G 3/2003 345/691 |
| 2018/0075813 | A1* | 3/2018 | Zhang | G09G 3/36 |
| 2022/0208055 | A1* | 6/2022 | Lim | G09G 3/20 |

FOREIGN PATENT DOCUMENTS

| | | |
|---|---|---|
| EP | 2461312 | 6/2012 |
| EP | 2869293 | 1/2019 |
| KR | 10-2020-0068321 | 6/2020 |
| KR | 10-2021-0120780 | 10/2021 |
| KR | 10-2022-0058369 | 5/2022 |

OTHER PUBLICATIONS

Korean Intellectual Property Office Application No. 10-2024-0047724, Office Action dated Nov. 27, 2024, 7 pages.
European Patent Office Application Serial No. 24184167.5, Search Report dated Dec. 16, 2024, 10 pages.

* cited by examiner

*Primary Examiner* — Towfiq Elahi
(74) *Attorney, Agent, or Firm* — LEE, HONG, DEGERMAN, KANG & WAIMEY

(57) ABSTRACT

According to an embodiment of the present disclosure, a display device may comprise a liquid crystal display (LCD) panel, a backlight including a plurality of backlight blocks that provide light to the LCD panel, wherein each of the plurality of backlight blocks includes a plurality of LEDs and a controller configured to extract an object area from an input image, obtain a local dimming gain to increase a luminance of the extracted object area, and control a current applied to backlight blocks mapped to the object area based on the obtained local dimming gain.

16 Claims, 15 Drawing Sheets

FIG. 9C

900

| Object APL | average local dimming 0 | 64 | 128 | 192 | 256 | 320 | 384 | 448 | 512 | 576 | 640 | 704 | 768 | 832 | 896 | 960 | 1023 |
|---|---|---|---|---|---|---|---|---|---|---|---|---|---|---|---|---|---|
| 0 | 128 | 128 | 128 | 128 | 128 | 128 | 128 | 128 | 128 | 128 | 128 | 128 | 128 | 128 | 128 | 128 | 128 |
| 256 | 128 | 128 | 128 | 128 | 130 | 132 | 134 | 139 | 139 | 139 | 139 | 139 | 139 | 139 | 134 | 130 | 128 |
| 512 | 128 | 128 | 128 | 128 | 130 | 134 | 138 | 145 | 145 | 145 | 145 | 145 | 145 | 145 | 138 | 130 | 128 |
| 768 | 128 | 128 | 128 | 128 | 138 | 145 | 152 | 158 | 158 | 158 | 158 | 158 | 158 | 158 | 153 | 138 | 128 |
| 1024 | 128 | 128 | 128 | 128 | 140 | 152 | 160 | 171 | 171 | 171 | 171 | 171 | 171 | 171 | 160 | 140 | 128 |
| 1280 | 128 | 128 | 128 | 128 | 140 | 155 | 175 | 185 | 185 | 185 | 185 | 185 | 185 | 185 | 168 | 144 | 128 |
| 1536 | 128 | 128 | 128 | 128 | 140 | 155 | 175 | 192 | 192 | 192 | 192 | 192 | 192 | 192 | 175 | 150 | 128 |
| 1792 | 128 | 128 | 128 | 128 | 140 | 155 | 175 | 192 | 192 | 192 | 192 | 192 | 192 | 192 | 175 | 150 | 128 |
| 2048 | 128 | 128 | 128 | 128 | 140 | 155 | 175 | 192 | 192 | 192 | 192 | 192 | 192 | 192 | 175 | 150 | 128 |
| 2304 | 128 | 128 | 128 | 128 | 140 | 155 | 175 | 192 | 192 | 192 | 192 | 192 | 192 | 192 | 175 | 150 | 128 |
| 2560 | 128 | 128 | 128 | 128 | 140 | 155 | 175 | 192 | 192 | 192 | 192 | 192 | 192 | 192 | 175 | 150 | 128 |
| 2816 | 128 | 128 | 128 | 128 | 140 | 155 | 175 | 192 | 192 | 192 | 192 | 192 | 192 | 192 | 175 | 150 | 128 |
| 3072 | 128 | 128 | 128 | 128 | 140 | 155 | 175 | 192 | 192 | 192 | 192 | 192 | 192 | 192 | 175 | 150 | 128 |
| 3328 | 128 | 128 | 128 | 128 | 140 | 155 | 175 | 192 | 192 | 192 | 192 | 192 | 192 | 192 | 175 | 150 | 128 |
| 3584 | 128 | 128 | 128 | 128 | 140 | 155 | 175 | 192 | 192 | 192 | 192 | 192 | 192 | 192 | 175 | 150 | 128 |
| 3840 | 128 | 128 | 128 | 128 | 140 | 155 | 175 | 192 | 192 | 192 | 192 | 192 | 192 | 192 | 175 | 150 | 128 |
| 4095 | 128 | 128 | 128 | 128 | 140 | 155 | 175 | 192 | 192 | 192 | 192 | 192 | 192 | 192 | 175 | 150 | 128 |

DISPLAY DEVICE AND OPERATING METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2024-0047724, filed on Apr. 9, 2024, the contents of which are all hereby incorporated by reference herein in their entireties.

BACKGROUND OF THE INVENTION

1. Field of the Invention

The present disclosure relates to a display device and a method of operating the same, and more particularly, to a local dimming method of a liquid crystal display device.

2. Discussion of the Related Art

Liquid crystal displays can be miniaturized compared to cathode ray tube (CRT), so they are used in display device such as portable information device, office equipment, and computer.

Transmissive liquid crystal display, which make up the majority of liquid crystal display device, displays image by controlling the electric field applied to the liquid crystal layer to modulate light incident from a backlight.

Local dimming is a backlight control technology used in LCD (Liquid Crystal Display) panel and monitors that use a backlight. Local dimming can improve the overall contrast ratio of the screen by lighting the screen locally and making dark area darker and bright area brighter.

However, previously, the expression range of local dimming data was limited to 10 bits, making it impossible to set data to a higher value.

In addition, the size of the current applied to the backlight blocks corresponding to the block areas that make up the entire area of the input image is set to be the same, making it difficult to improve the contrast ratio and three-dimensional effect.

SUMMARY OF THE INVENTION

The purpose of the present disclosure may be to improve the expression area of data by setting a higher grayscale value of object included in an image.

The purpose of the present disclosure may be to improve contrast ratio and three-dimensional effect by locally setting the current applied to backlight blocks corresponding to the object area.

The present disclosure may be intended to prevent a foggy phenomenon that may occur due to an increase in luminance of an object area.

According to an embodiment of the present disclosure, a display device may comprise a liquid crystal display (LCD) panel, a backlight including a plurality of backlight blocks that provide light to the LCD panel, wherein each of the plurality of backlight blocks includes a plurality of LEDs and a controller configured to extract an object area from an input image, obtain a local dimming gain to increase a luminance of the extracted object area, and control a current applied to backlight blocks mapped to the object area based on the obtained local dimming gain.

According to an embodiment of the present disclosure, a method of operating a display device including a liquid crystal display (LCD) panel and a backlight including a plurality of backlight blocks that provide light to the LCD panel, may comprise extracting an object area from an input image, obtaining a local dimming gain to increase a luminance of the extracted object area and controlling a current applied to backlight blocks mapped to the object area based on the obtained local dimming gain.

According to an embodiment of the present disclosure, the expressiveness of an object included in an image can be improved by increasing the local luminance of the object.

According to an embodiment of the present disclosure, the contrast ratio and three-dimensional effect of objects included in an input image can be greatly improved. Accordingly, the viewer's sense of immersion in watching the video may increase.

According to an embodiment of the present disclosure, a foggy phenomenon caused by an increase in luminance of an object area can be prevented.

BRIEF DESCRIPTION OF THE DRAWINGS

FIG. 9C is a drawing explaining a local dimming gain table.

DETAILED DESCRIPTION OF THE PREFERRED EMBODIMENTS

Hereinafter, the present specification will be described in more detail with reference to the drawings.

Terms containing ordinal numbers, such as first, second, etc., may be used to describe various components, but the components are not limited by the terms. The above terms are used only for the purpose of distinguishing one component from another.

Singular expression includes plural expressions unless the context clearly dictates otherwise.

In this application, terms such as "comprise" or "have" are intended to designate the presence of features, numbers, steps, operations, components, parts, or combinations thereof described in the specification, but are not intended to indicate the presence of one or more other features and it should be understood that this does not exclude in advance the possibility of the existence or addition of elements, numbers, steps, operations, components, parts, or combinations thereof.

Figure 1:
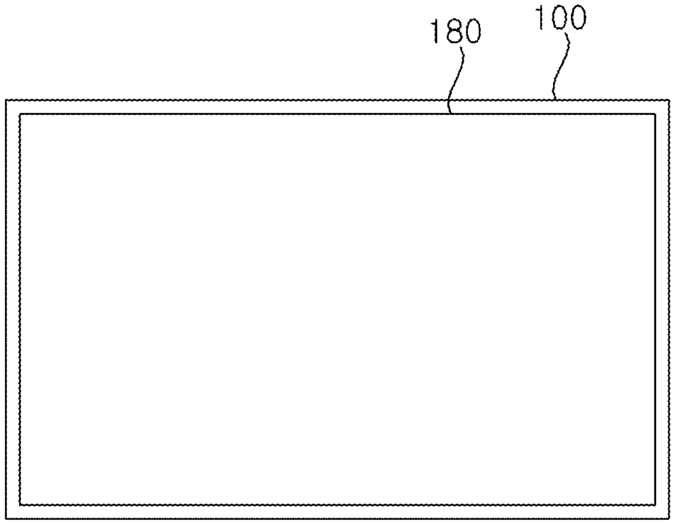
FIG. 1 is a diagram illustrating a display device according to an embodiment of the present invention.

FIG. 1 is a diagram illustrating a display device according to an embodiment of the present disclosure.

Referring to the drawings, the display device 100 may include a display 180.

Meanwhile, the display 180 may be implemented as any one of various panels.

In the present disclosure, the display 180 is provided with a liquid crystal display panel (LCD panel). Hereinafter, the display device 100 may be a liquid crystal display.

Meanwhile, the display device 100 of FIG. 1 may be a monitor, TV, tablet PC, mobile terminal, etc.

Figure 2:
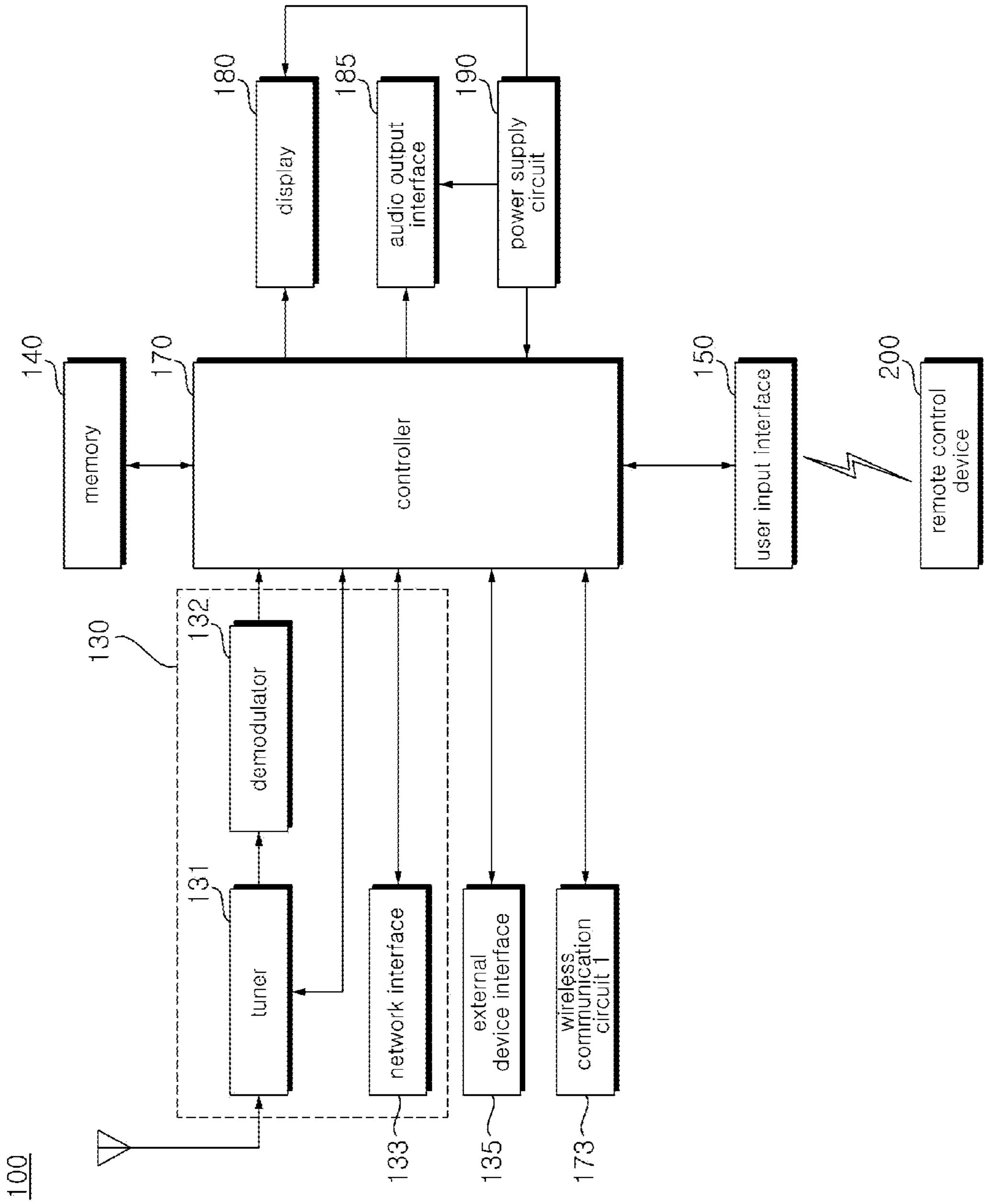
FIG. 2 is an example of a block diagram of the inside of the display device in FIG. 1.

FIG. 2 is a block diagram showing the configuration of the display device of FIG. 1.

Referring to FIG. 2, the display device 100 may include a broadcast receiver 130, an external device interface 135, a memory 140, a user input interface 150, a controller 170, and a wireless communication circuit 173, a display 180, an audio output interface 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for a specific selected broadcast channel.

The demodulator 132 may separate the received broadcast signal into a video signal, an audio signal, and a data signal related to the broadcast program, and may restore the separated video signal, audio signal, and data signal to a form that may be output.

The network interface 133 may provide an interface for connecting the display device 100 to a wired/wireless network including an Internet network.

The external device interface 135 may receive an application or application list in an adjacent external device and transmit it to the controller 170 or the memory 140.

The external device interface 135 may provide a connection path between the display device 100 and an external device. The external device interface 135 may receive one or more of video and audio output from an external device connected wirelessly or wired to the display device 100 and transmit it to the controller 170.

The external device interface 135 may include a plurality of external input terminals. The plurality of external input terminals may include an RGB terminal, one or more High Definition Multimedia Interface (HDMI) terminals, and a component terminal.

An image signal from an external device input through the external device interface 135 may be output through the display 180. A audio signal from an external device input through the external device interface 135 may be output through the audio output interface 185.

An external device that may be connected to the external device interface 135 may be any one of a set-top box, Blu-ray player, DVD player, game console, sound bar, smartphone, PC, USB memory, or home theater, but this is only an example.

The memory 140 stores program for processing and controlling each signal in the controller 170, and may store signal-processed video, audio, or data signal.

The memory 140 may perform a function for temporarily storing video, voice, or data signal input from the external device interface 135 or the network interface 133, and may store information about a predetermined image through a channel memory function.

The user input interface 150 may transmit a signal input by the user to the controller 170 or transmit a signal from the controller 170 to the user. For example, the user input interface 150 may receive a control signal for a power on/off, a channel selection, and a screen setting to process according to various communication methods such as Bluetooth, Ultra Wideband (WB), ZigBee, Radio Frequency (RF) communication, or infrared (IR) communication from the remote control device 200, or may process a control signal from the controller 170 may be transmitted to the remote control device 200.

Additionally, the user input interface 150 may transmit a control signal input from local keys (not shown) such as power key, channel key, volume key, and setting value to the controller 170.

The image signal processed by the controller 170 may be input to the display 180 and displayed as an image corresponding to the image signal. Additionally, the image signal processed by the controller 170 may be input to an external output device through the external device interface 135.

The audio signal processed by the controller 170 may be output as audio to the audio output interface 185. Additionally, the audio signal processed by the controller 170 may be input to an external output device through the external device interface 135.

In addition, the controller 170 may control overall operations within the display device 100.

The controller 170 may control the image signal or the audio signal from an external device, for example, a camera or camcorder, input through the external device interface 135 according to an external device image playback command received through the user input interface 150 to be output through the display 180 or the audio output interface 185.

Meanwhile, the controller 170 may control the display 180 to display an image, for example, a broadcast image input through the tuner 131, or an external input input through the external device interface 135, an image input through the network interface, or an image stored in the memory 140 may be controlled to be displayed on the display 180. In this case, the image displayed on the display 180 may be a still image or a moving image, and may be a 2D image or 3D image.

The controller 170 may control the playback of content stored in the display device 100, received broadcast content, or external input content, including broadcast video, external input video, audio file, and still image, connected web screen, and document file, etc.

The wireless communication circuit 173 may communicate with external device through wired or wireless communication. The wireless communication circuit 173 may perform short range communication with an external device.

For this purpose, the wireless communication circuit 173 may support a short-range communication using at least one of Bluetooth™, BLE (Bluetooth Low Energy), RFID (Radio Frequency Identification), Infrared Data Association (IrDA), UWB (Ultra Wideband), ZigBee, NFC (Near Field Communication), Wi-Fi (Wireless-Fidelity) Wi-Fi Direct and Wireless USB (Wireless Universal Serial Bus) technology.

The display 180 may convert the video signal, data signal, and OSD signal processed by the controller 170 or the video signal and data signal received from the external device interface 135 into R, G, and B signals, respectively, and generate a driving signal.

Meanwhile, the display device 100 shown in FIG. 2 is only an example of the present disclosure. Some of the illustrated components may be integrated, added, or omitted depending on the specification of the display device 100 that is actually implemented.

That is, as needed, two or more components may be combined into one component, or one component may be subdivided into two or more components.

Additionally, the functions performed in each block are for explaining embodiments of the present disclosure, and the specific operations or devices do not limit the scope of the present disclosure.

The audio output interface 185 receives the audio-processed signal from the controller 170 and outputs it as audio.

The power supply circuit 190 supplies the corresponding power throughout the display device 100. In particular, power may be supplied to the controller 170, which may be implemented in the form of a system on chip (SOC), the display 180 for displaying image, and the audio output interface 185 for audio output.

Specifically, the power supply circuit 190 may include a converter that converts alternating current power to direct current power and a dc/dc converter that converts the level of direct current power.

The remote control device 200 transmits user input to the user input interface 150.

For this purpose, the remote control device 200 may use Bluetooth, Radio Frequency (RF) communication, infrared (IR) communication, Ultra Wideband (UWB), ZigBee, etc. Additionally, the remote control device 200 may receive video, audio, or data signals output from the user input interface 150, and display them or output audio signals on the remote control device 200.

Figure 3:
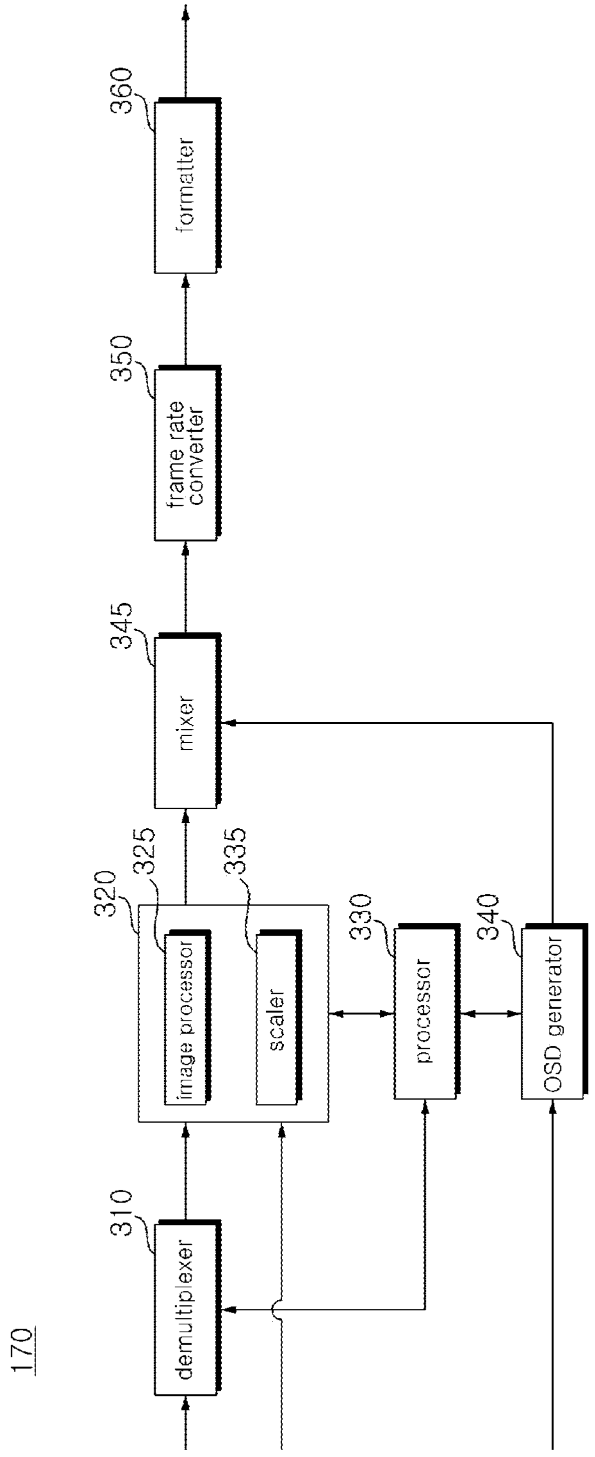
FIG. 3 is an example of a block diagram of the inside of a controller in FIG. 2.

FIG. 3 is an example of an internal block diagram of the controller of FIG. 2.

When described with reference to the drawing, the controller 170 according to an embodiment of the present disclosure may include a demultiplexer 310, an image processor 320, a processor 330, an OSD generator 340, and a mixer 345, a frame rate converter 350, and a formatter 360. In addition, it may further include an audio processor (not shown) and a data processor (not shown).

The demultiplexer 310 demultiplexes the input stream. For example, when MPEG-2 TS is input, it may be demultiplexed and separated into video, voice, and data signals. Here, the stream signal input to the demultiplexer 310 may be a stream signal output from the tuner 110, the demodulator 120, or the external device interface 130.

The image processor 320 may perform image processing of demultiplexed video signal. For this purpose, the image processor 320 may include an video decoder 325 and a scaler 335.

The video decoder 325 decodes the demultiplexed video signal, and the scaler 335 performs scaling so that the resolution of the decoded video signal may be output on the display 180.

The video decoder 325 may be equipped with decoder of various standards. For example, an MPEG-2, H,264 decoder, a 3D video decoder for color image and depth image, a decoder for multiple viewpoint images, etc. may be provided.

The processor 330 may control overall operations within the display device 100 or the controller 170. For example, the processor 330 may control the tuner 110 to select (tuning) an RF broadcast corresponding to a channel selected by the user or a pre-stored channel.

Additionally, the processor 330 may control the display device 100 by a user command or internal program input through the user input interface 150.

Additionally, the processor 330 may perform data transmission control with the network interface 135 or the external device interface 130.

Additionally, the processor 330 may control the operations of the demultiplexer 310, the image processor 320, and the OSD generator 340 within the controller 170.

The OSD generator 340 generates an OSD signal according to user input or by itself. For example, based on a user input signal, a signal may be generated to display various information in graphic or text on the screen of the display 180. The generated OSD signal may include various data such as a user interface screen of the display device 100, various menu screen, widget, and icon. Additionally, the generated OSD signal may include 2D object or 3D object.

Additionally, the OSD generator 340 may generate a pointer that may be displayed on the display 180 based on the pointing signal input from the remote control device 200. In particular, such a pointer may be generated in a pointing signal processor, and the OSD generator 340 may include such a pointing signal processor (not shown). Of course, it is also possible that the pointing signal processor (not shown) is provided separately rather than within the OSD generator 340.

The mixer 345 may mix the OSD signal generated by the OSD generator 340 and the decoded video signal processed by the image processor 320. The mixed video signal is provided to the frame rate converter 350.

The frame rate converter (FRC) 350 may convert the frame rate of the input video. Meanwhile, the frame rate converter 350 is also capable of outputting the video as is without separate frame rate conversion.

Meanwhile, the formatter 360 may change the format of an input video signal into a video signal for display on a display and output it.

The formatter 360 may change the format of the video signal. For example, the format of the 3D video signal may be changed to any one of various 3D formats such as Side by Side format, Top/Down format, Frame Sequential format, Interlaced format, Checker Box format.

Meanwhile, the audio processor (not shown) in the controller 170 may perform audio processing of the demultiplexed audio signal. For this purpose, the audio processor (not shown) may be equipped with various decoders.

Additionally, the audio processor (not shown) within the controller 170 may process bass, treble, and volume control.

The data processor (not shown) within the controller 170 may perform data processing of the demultiplexed data signal. For example, if the demultiplexed data signal is an encoded data signal, it may be decoded. The encoded data signal may be electronic program guide information including broadcast information such as the start time and end time of the broadcast program aired on each channel.

Meanwhile, the block diagram of the controller 170 shown in FIG. 3 is a block diagram for an embodiment of the present disclosure. Each component of the block diagram may be integrated, added, or omitted depending on the specifications of the controller 170 that is actually implemented.

In particular, the frame rate converter 350 and the formatter 360 may not be provided within the controller 170, but may be provided separately or as a single module.

Figure 4:
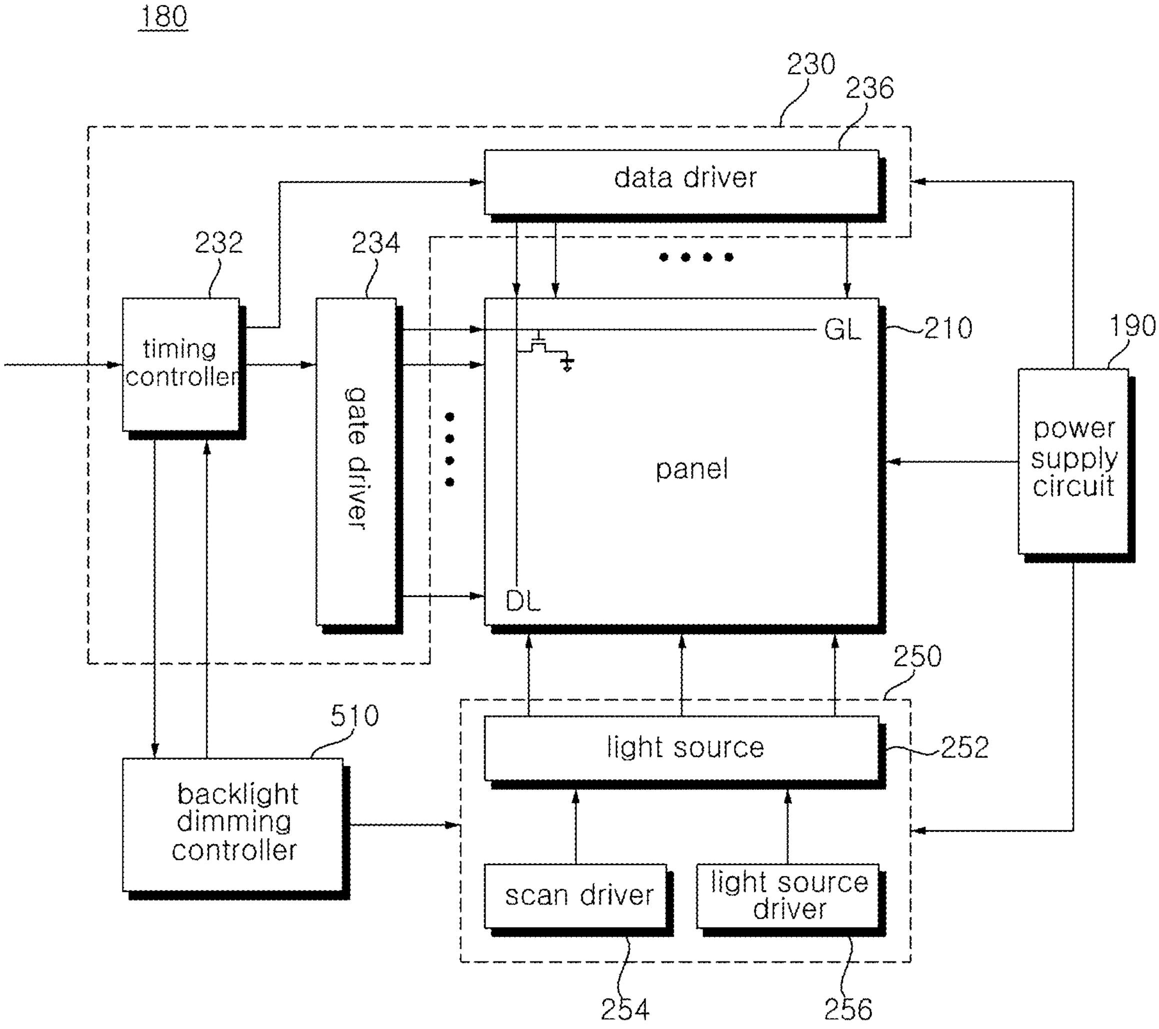
FIG. 4 is a block diagram of the inside of the display.

FIG. 4 is an internal block diagram of the display of FIG. 2.

Referring to the drawing, the display module 180 based on a liquid crystal display panel (LCD panel) may include a liquid crystal display panel 210, a driving circuit 230, a backlight 250, and a backlight dimming controller 510.

In order to display an image, a plurality of gate lines (GL) and data lines (DL) are intersected in a matrix form, and the liquid crystal display panel 210 may include a first substrate a thin film transistor and a pixel electrode connected to it are formed in the intersecting area, a second substrate provided with a common electrode, and a liquid crystal layer formed between the first substrate and the second substrate.

The driving circuit 230 drives the liquid crystal display panel 210 through control signal and data signal supplied from the controller 170 of FIG. 1. To this end, the driving circuit 230 includes a timing controller 232, a gate driver 234, and a data driver 236.

The timing controller 232 receives a control signal, R, G, B data signals, vertical synchronization signal (Vsync), etc. from the controller 170, and controls the gate driver 234 and the data driver 236 in response to the control signal and rearranges the R, G, and B data signals to provide to the data driver 236.

Under the control of the gate driver 234, data driver 236, and timing controller 232, scanning signal and image signal are supplied to the liquid crystal display panel 210 through the gate line (GL) and data line (DL).

The backlight 250 supplies light to the liquid crystal display panel 210. To this end, the backlight 250 may include a light source 252, a scan driver 254 that controls the scanning drive of the light source 252, and a light source driver 256 that turns on/off the light source 252.

With the light transmittance of the liquid crystal layer adjusted by the electric field formed between the pixel electrode and the common electrode of the liquid crystal display panel 210, a predetermined image is displayed using light emitted from the backlight 250.

The power supply circuit 190 may supply a common electrode voltage (Vcom) to the liquid crystal display panel 210 and a gamma voltage to the data driver 236. Additionally, driving power for driving the light source 252 may be supplied to the backlight 250.

Meanwhile, the backlight 250 may be divided into a plurality of blocks and driven. The controller 170 may control the display 180 to perform local dimming by setting a dimming value for each of the plurality of blocks. Specifically, the timing controller 232 outputs input image data (RGB) to the backlight dimming controller 510, and the backlight dimming controller 510 may calculate the dimming value of each of the plurality of blocks based on the input image data (RGB) received from the timing controller 232.

The backlight dimming controller 510 may output dimming values to the backlight 250. The dimming value may include at least one of a duty ratio for driving each backlight block or an current magnitude ratio.

Figure 5:
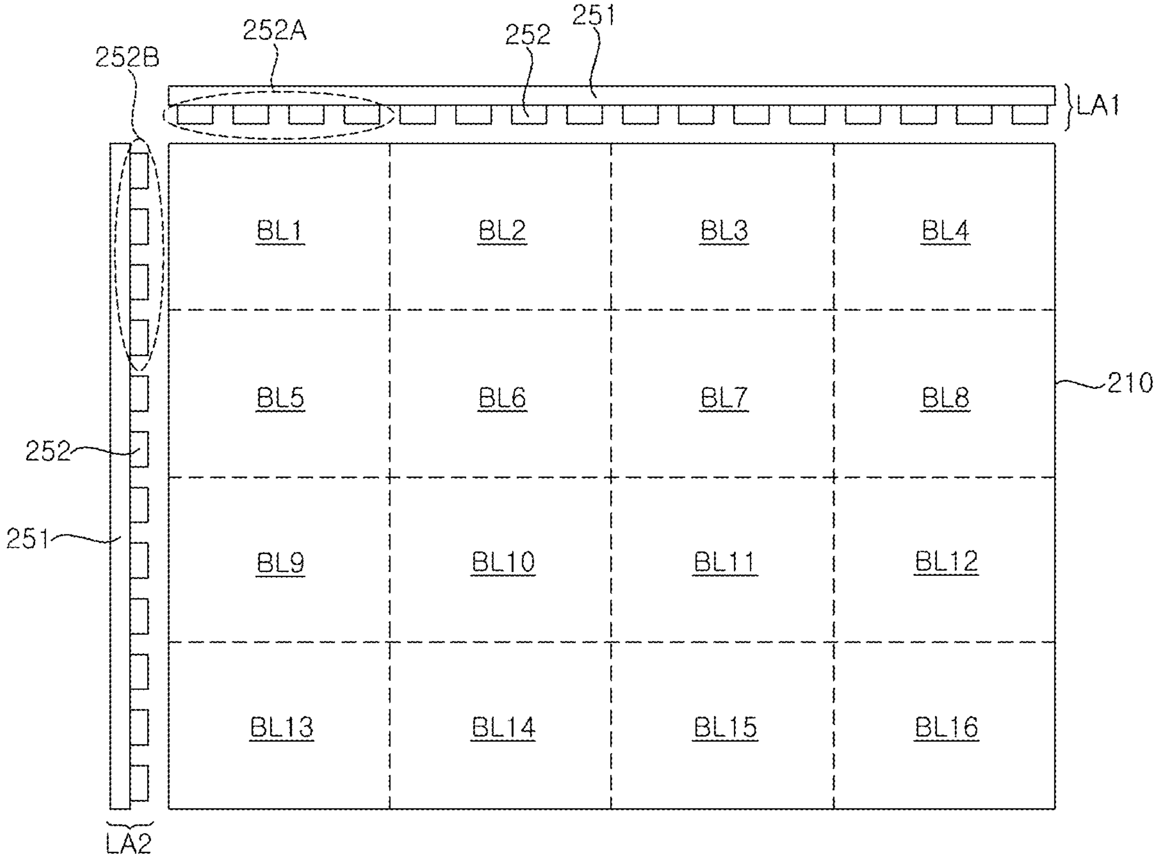
FIG. 5 is an example showing arrangement of a liquid crystal display panel and light sources in a direct-type backlight.
Figure 6:
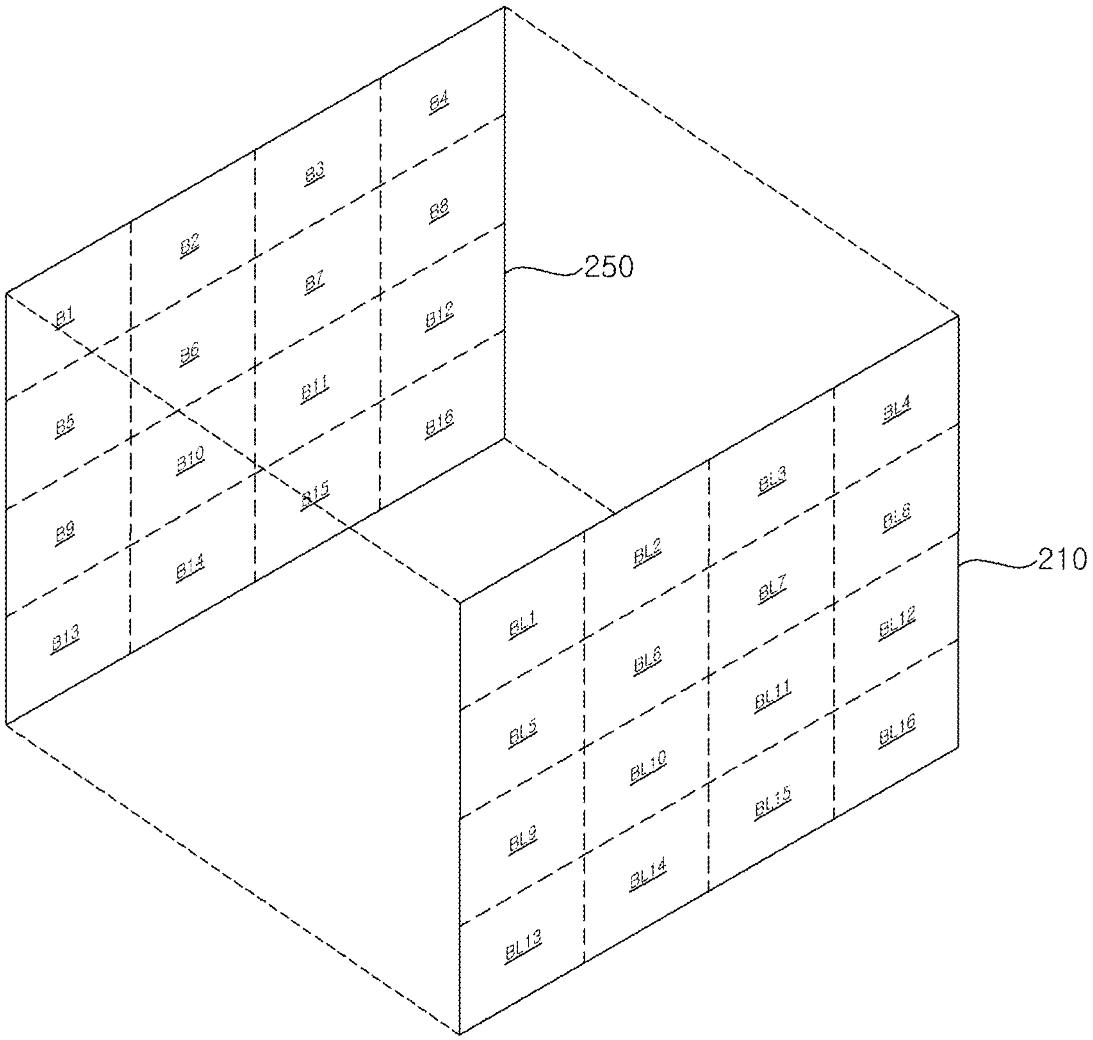
FIG. 6 is an example showing arrangement of a liquid crystal display panel and light sources in an edge type backlight.

FIG. 5 is an example diagram showing the arrangement of a liquid crystal display panel and light sources in the case of an edge-type backlight, and FIG. 6 is an example diagram showing the arrangement of a liquid crystal display panel and light sources in the case of a direct-type backlight.

The liquid crystal display panel 210 may be divided into a plurality of virtual blocks as shown in FIGS. 5 and 6. FIGS. 5 and 6 illustrate that the liquid crystal display panel 210 is equally divided into 16 blocks BL1 to BL16, but it should be noted that the display is not limited thereto. Each of the plurality of blocks may include a plurality of pixels.

The backlight 250 may be implemented as either an edge type or a direct type.

The edge-type backlight 250 has a structure in which a plurality of optical sheets and a light guide plate are stacked below the liquid crystal display panel 210, and a plurality of light sources are disposed on the sides of the light guide plate.

When the backlight 250 is implemented as an edge-type backlight, light sources are disposed on at least one of the upper and lower sides and at least one of the left and right sides of the liquid crystal display panel 210. In FIG. 5, the first light source array LA1 is disposed on the upper side of the liquid crystal display panel 210, and the second light source array LA2 is disposed on the left side of the liquid crystal display panel 210. Each of the first and second light source arrays LA1 and LA2 includes a plurality of light sources 252 and a light source circuit board 251 on which the plurality of light sources 252 are mounted. In this case, the brightness of the light incident on the first block BL1 of the liquid crystal display panel 210 may be adjusted using the light sources 252A of the first light source array LA1 disposed at a position corresponding to the first block BL1 of the liquid crystal display panel 210 and the light sources 252B of the second light source array LA2.

The direct backlight 250 has a structure in which a plurality of optical sheets and a diffusion plate are stacked below the liquid crystal display panel 210 and a plurality of light sources are arranged below the diffusion plate.

When the backlight 250 is implemented as a direct backlight, it is divided to correspond one-to-one to the blocks BL1 to BL16 of the liquid crystal display panel 210, as shown in FIG. 6. In this case, the brightness of the light incident on the first block BL1 of the liquid crystal display panel 210 may be adjusted using the light sources 252 included in the block B1 of the backlight 250 disposed at a position corresponding to the first block BL1 of the liquid crystal display panel 210.

The light sources 252 may be implemented as point light sources such as light emitting diodes (LEDs). The light sources 252 are turned on and off by receiving light source driving signal (LDS) from the light source driver 256. The light intensity of the light sources 252 may be adjusted according to the amplitude of the light source driving signal (LDS), and the lighting period may be adjusted according to the pulse width (or duty ratio). The brightness of light output from the light sources 252 may be adjusted according to the light source driving signal (LDS).

The light source driver 256 may generate light source driving signal (LDS) based on the dimming value of each block input from the backlight dimming controller 510 and output them to the light source 252.

Figure 7:
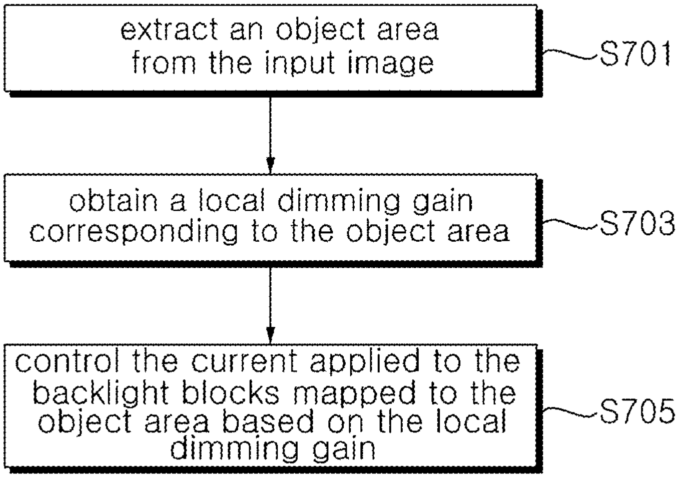
FIG. 7 is a flowchart explaining a method of operating a display device according to an embodiment of the present disclosure.

FIG. 7 is a flowchart explaining a method of operating a display device according to an embodiment of the present disclosure.

Referring to FIG. 7, the controller 170 of the display device 100 may extract an object area from the input image (S701).

In one embodiment, the controller 170 may receive an input image through the broadcast receiver 130.

In another embodiment, the controller 170 may receive an input image through the external device interface 135.

The object area may be an area representing any one of a person's face, a light source element (eg, a light), a broadcast logo, or an object with depth (a close object or a distant object). The object area may have a square or circular shape, but this is only an example.

The object area may be an area containing an object that is a major element in the input image during a viewing.

The controller 170 may extract an object or object area from an input image using an object detection model based on an artificial neural network learned through machine learning. The artificial neural network-based object detection model may be either a single-step YOLO (you Only Look Once) model or a two-step Faster R-CNN (Region with Convolution Neural Network) model.

The memory 140 may store an object detection model.

In another embodiment, the controller 170 may transmit an input image to an external server that stores an object detection model and receive information about the object or object area from the external server. Information about the object or object area may include identification information of the object and the location of the object area.

The YOLO (you Only Look Once) model is a model that can predict an object existing in an image by looking at the object area representing the location of the object only once.

The YOLO (you Only Look Once) model divides the original image into grids of equal size. In addition, the YOLO (you Only Look Once) model can predict the number of bounding boxes specified in a predefined form centered on the center of the grid for each grid and calculate reliability based on this.

Afterwards, a determination is made as to whether the image contains an object or is only the background, and a location with high object reliability is selected to identify the object category.

Next, we explain the process of extracting object regions through the Faster R-CNN (Region with Convolution Neural Network) model.

First, a feature map is extracted from the image through a CNN (Convolution Neural Network) model. Based on the extracted feature map, a plurality of regions of interest (RoI) are extracted. RoI pooling is performed for each region of interest.

RoI pooling is a process of setting a grid on which a feature map with a region of interest is projected to fit a predetermined H×W size, extracting the largest value for each cell included in each grid, and extracting a feature map with the H×W size.

A feature vector may be extracted from a feature map having an H×W size, and an object area indicating the location of the object and the object may be extracted from the feature vector.

The controller 170 may obtain a local dimming gain corresponding to the extracted object area (S703).

In one embodiment, the local dimming gain may be a gain used to increase the luminance of backlight blocks mapped to the object area. The local dimming gain may be a ratio for increasing the maximum grayscale value of the object area compared to the maximum grayscale value of the remaining areas other than the object area.

The local dimming gain may have a value ranging from 1 to 1.5. The maximum value of local dimming gain may be 1.5. That is, the local dimming gain may be within a limited range. This is to prevent excessive current from being applied to backlight blocks corresponding to the object area when there is no upper limit of the local dimming gain.

If excessive current is applied to the backlight blocks corresponding to the object area, the object area may become too bright and the image may be unnatural.

The controller 170 may obtain a local dimming gain based on the average picture level (APL) data value of the object area included in the input image and the average local dimming data value of the input image.

This will be described in detail with reference to FIG. 8.

Figure 8:
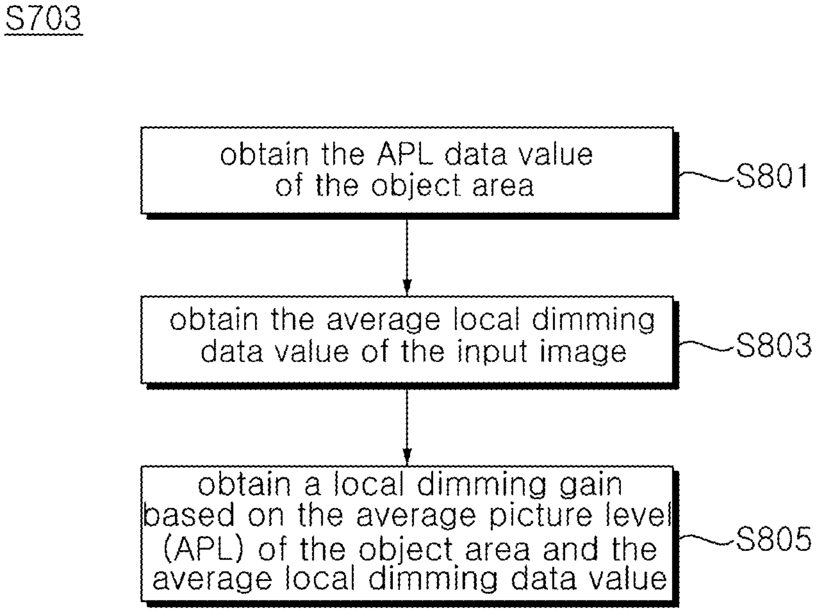
FIG. 8 is a flowchart illustrating a process for obtaining local dimming gain of an object area according to an embodiment of the present disclosure.

FIG. 8 is a flowchart illustrating a process for obtaining local dimming gain of an object area according to an embodiment of the present disclosure.

FIG. 8 is a diagram specifying step S703 of FIG. 7.

The controller 170 may obtain the APL data value of the object area (S801).

APL may represent the ratio between the sum of the maximum values of each pixel to the total number of pixels. The APL data value may be a grayscale value within the range of 0 to 4095 (based on 12 bits) matched to the APL. That is, the APL data value may be a grayscale value corresponding to APL.

APL data values can be applied as 12 bits.

The controller 170 may measure the APL of the object area based on RGB data applied to each of the panel blocks matched to the object area.

The APL of the object area can be measured using the following [Equation 1].

$$APL(\%) = \frac{\text{SUM}\{\text{Max.}(R, G, B)/255\}}{\text{total number of pixels}} \times 100 \quad \text{[Equation 1]}$$

R stands for red data, G stands for green data, and B stands for blue data. Max(R, G, B) is the maximum value among R, G, and B, and SUM{Max(R, G, B)} is the sum of the maximum values among R, G, and B. The total pixel count is the number of all pixels that make up the object area.

An image with a large number of bright pixel data have a large APL. On the other hand, an image with a small number of bright pixel data has a small APL.

APL and APL data values may be proportional. That is, as the APL increases, the APL data value may also increase, and as the APL decreases, the APL data value may also decrease.

APL and APL data values may be mapped in the form of a lookup table and stored in the memory 140.

The controller 170 may obtain an APL data value corresponding to the APL calculated through a lookup table. The APL data value can be any one of 17 values in the range of 0 to 4095.

If the APL exists between the APL values corresponding to two APL data values, it may be matched to one of the APL values corresponding to the two APL data values according to interpolation.

The controller 170 may obtain the average local dimming data value of the input image (S803).

In one embodiment, the average local dimming data value may be an average value of local dimming data values of each of a plurality of backlight blocks corresponding to the entire area of the input image.

In one embodiment, the local dimming data value of the backlight block may refer to any one of the grayscale value of the panel block corresponding to the backlight block, the current magnitude ratio applied to the backlight block, or the current duty ratio applied to the backlight block.

When the local dimming data value is a grayscale value of a panel block, the grayscale value may be any one of separated 17 values divided within the range of 0 to 1023 based on 10 bits.

In one embodiment, the controller 170 may calculate the grayscale value of the panel block based on the current duty ratio applied to each of the plurality of backlight blocks. A signal having the same current duty ratio may be applied to each of the plurality of backlight blocks.

The current duty ratio and grayscale value of the PWM signal applied to the backlight block may be proportional. That is, as the current duty ratio increases, the gray scale value may also increase, and as the current duty ratio decreases, the gray scale value may also decrease.

The controller 170 may obtain a current duty ratio for driving the backlight block from the backlight dimming controller 510 and extract a local dimming data value corresponding to the current duty ratio. Meanwhile, the backlight dimming controller 510 may be included in the controller 170.

The current duty ratio and grayscale value may be mapped in the form of a lookup table and stored in the memory 140.

The controller 170 may calculate a plurality of grayscale values corresponding to each of the plurality of panel blocks constituting the liquid crystal display panel 210, and obtain the average value of the calculated plurality of grayscale values as the average local dimming data value.

The execution order of steps S801 and 803 may be reversed.

The controller 170 may obtain a local dimming gain based on the average picture level (APL) of the object area and the average local dimming data value (S805).

The controller 170 may determine the local dimming gain using a local dimming gain table indicating the correspondence between the APL data value and the average local dimming data value.

The local dimming gain table may be stored in the memory 140.

The process of obtaining local dimming gain will be described with reference to FIGS. 9A to 9C.

Figure 9A:
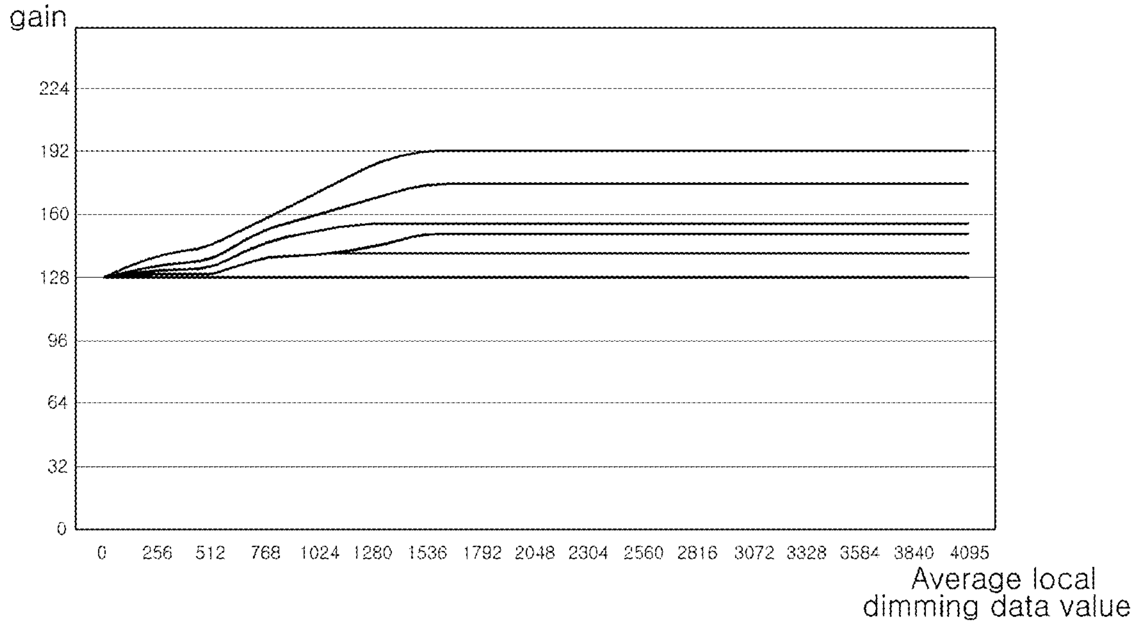
FIG. 9A is a graph showing the first dimming gain based on the APL data value of the object area.
Figure 9B:
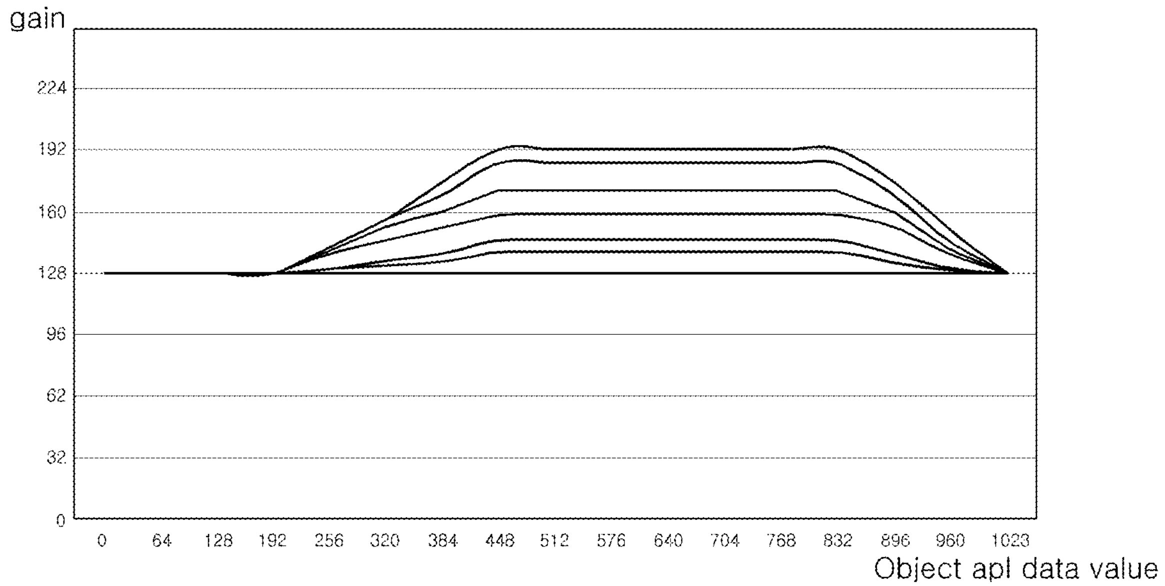
FIG. 9B is a graph showing the second dimming gain based on the average local dimming data value.

FIG. 9A is a graph showing the first dimming gain based on the APL data value of the object area, FIG. 9B is a graph showing the second dimming gain based on the average local dimming data value, and FIG. 9C is a drawing explaining a local dimming gain table.

Referring to FIGS. 9A to 9C, the APL data value of the object area may be divided into a total of 17 gray level values within the range from 0 to 4095, and the average local dimming data value may be divided into a total of 17 gray level values within the range from 0 to 1023.

The horizontal axis of FIG. 9A represents the APL data value of the object area, and the vertical axis may represent the first dimming gain. The first dimming gain may be in the range of 128 to 192.

Each graph in FIG. 9A may be a graph showing the first dimming gain according to the average local dimming data value when the APL data value of the object area has a specific value.

Each graph in FIG. 9B may be a graph showing the second dimming gain according to the APL data value of the object area when the average local dimming data value has a specific value.

The local dimming table 900 of FIG. 9C may be a table indicating a dimming gain matched between the APL data value of the object area and the average local dimming data value.

The local dimming table 900 may be a 17×17 table created by combining the APL data value of the object area and the average local dimming data value.

If the average local dimming data value and the APL data value of the object area for the local dimming table 900 are separated and expressed in a graph format, graphs such as FIGS. 9A and 9B may be created.

For example, if the average local dimming data value is 512 and the APL data value of the object area is 1536, the dimming gain may be 192.

A dimming gain of 128 may correspond to a local dimming gain of 1, and in this case, the local dimming gain may be 192/128=1.5.

In this way, the controller 170 may obtain a local dimming gain using the local dimming gain table 900.

Meanwhile, the local dimming gain may be within a range of 1 to 1.5. The reason for setting a limit to the local dimming gain is that if a large amount of current is applied to the backlight blocks corresponding to the object area, the brightness of the object area may become too bright and the image may become unnatural.

Again, FIG. 7 will be described.

The controller 170 may control the current applied to the backlight blocks mapped to the object area based on the obtained local dimming gain (S705).

In one embodiment, the controller 170 may identify the locations of backlight blocks mapped to the extracted object area. The controller 170 may control the current applied to the identified backlight blocks based on the local dimming gain.

The controller 170 may control one or more of the amplitude (current magnitude ratio) and width (current duty ratio) of the signal applied to each of the plurality of backlight blocks corresponding to the object area based on the local dimming gain.

The controller 170 may generate a signal that is a combination of pulse amplitude modulation (PAM) and pulse width modulation (PWM) methods and apply the generated signal to the backlight block.

The controller 170 may control the current applied to the plurality of backlight blocks so that the maximum gray level value of the object area is greater than the maximum gray level value of the remaining areas other than the object area.

Figure 10:
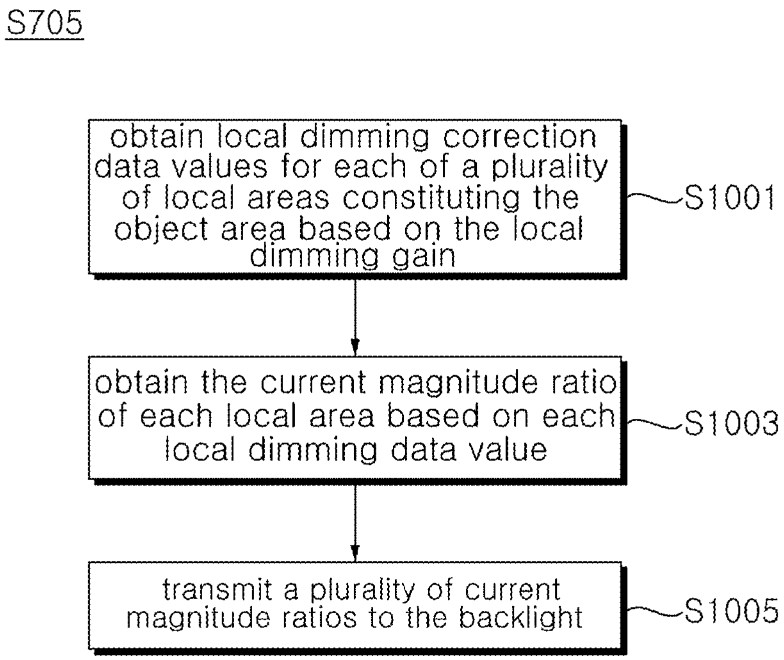
FIGS. 10 to 11D are flowcharts illustrating a process of controlling a backlight block based on a local dimming gain according to an embodiment of the present disclosure.
Figure 11A:
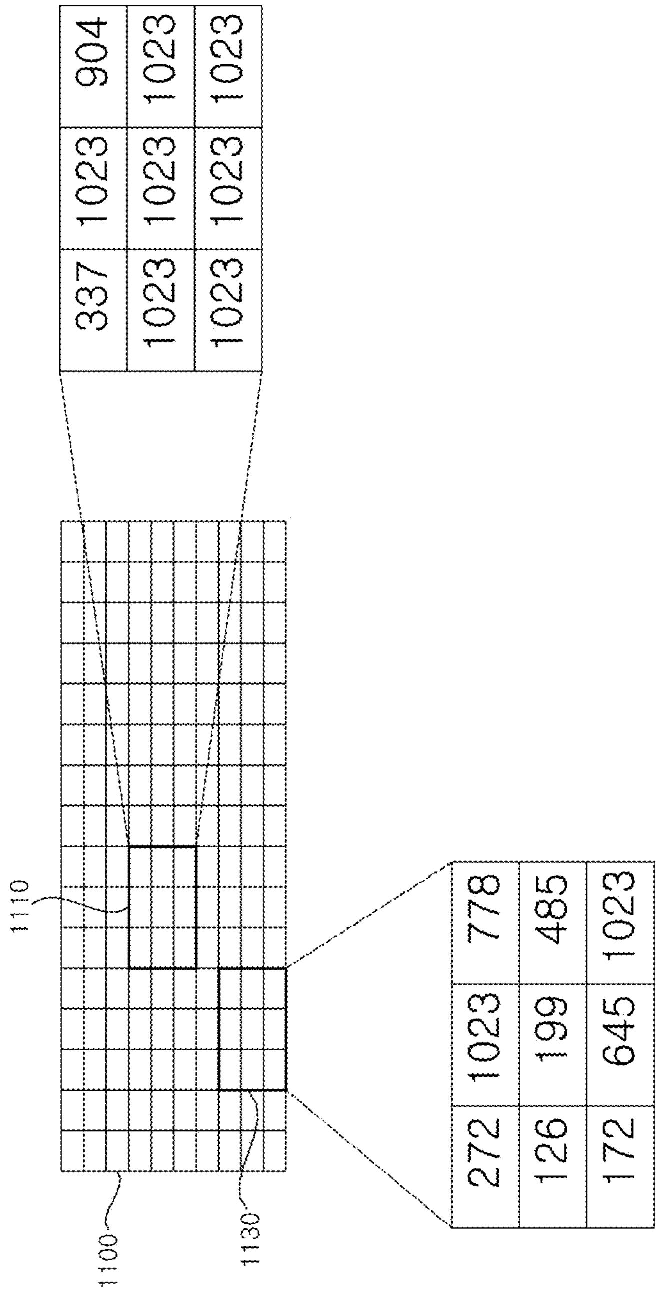
Figure 11B:
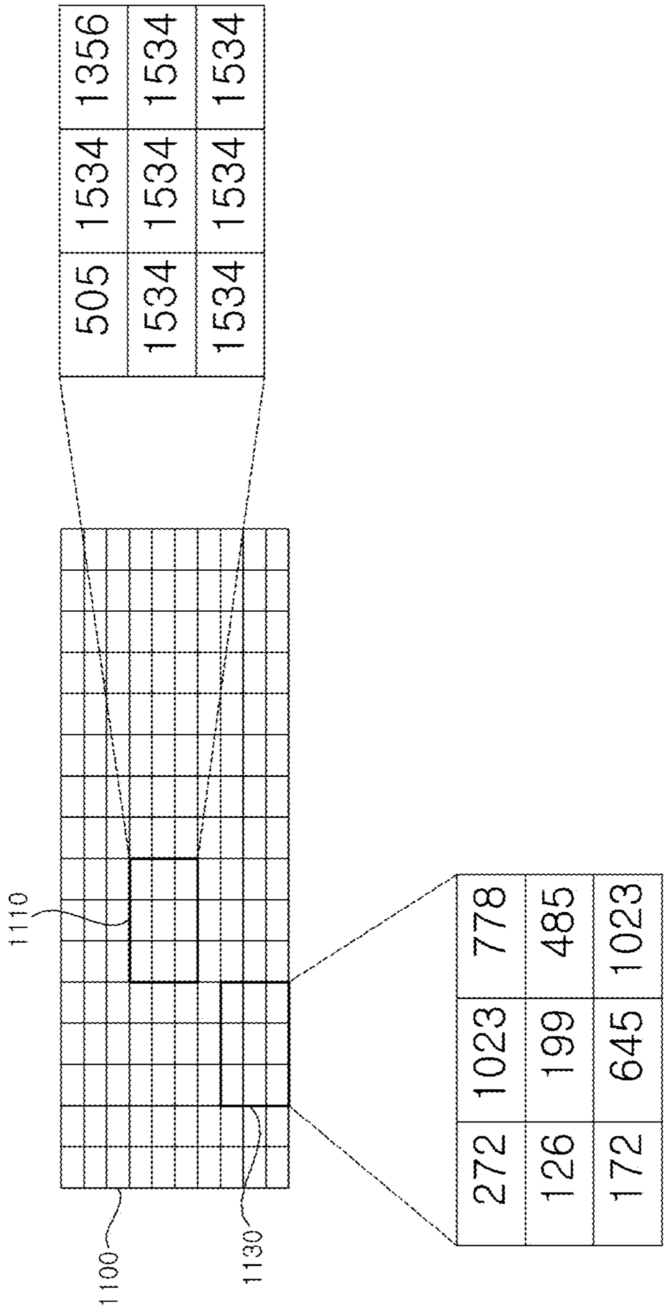
Figure 11C:
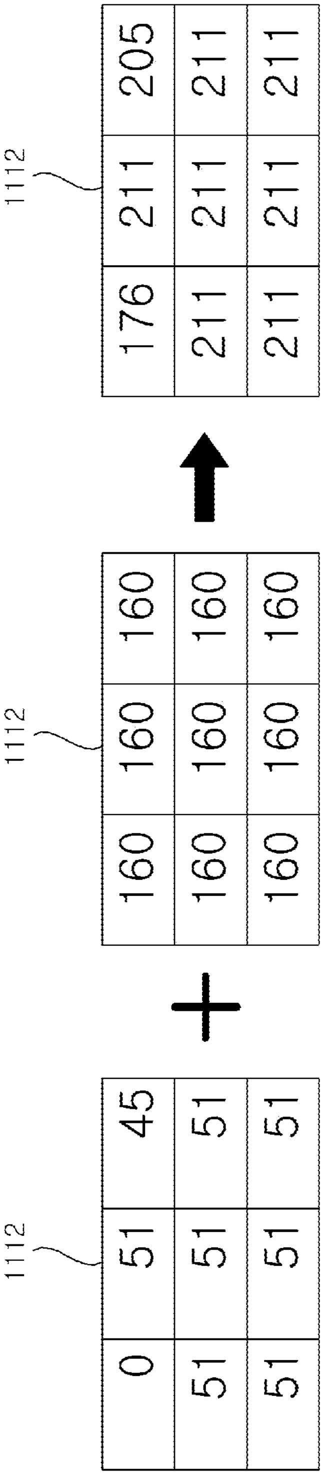
Figure 11D:
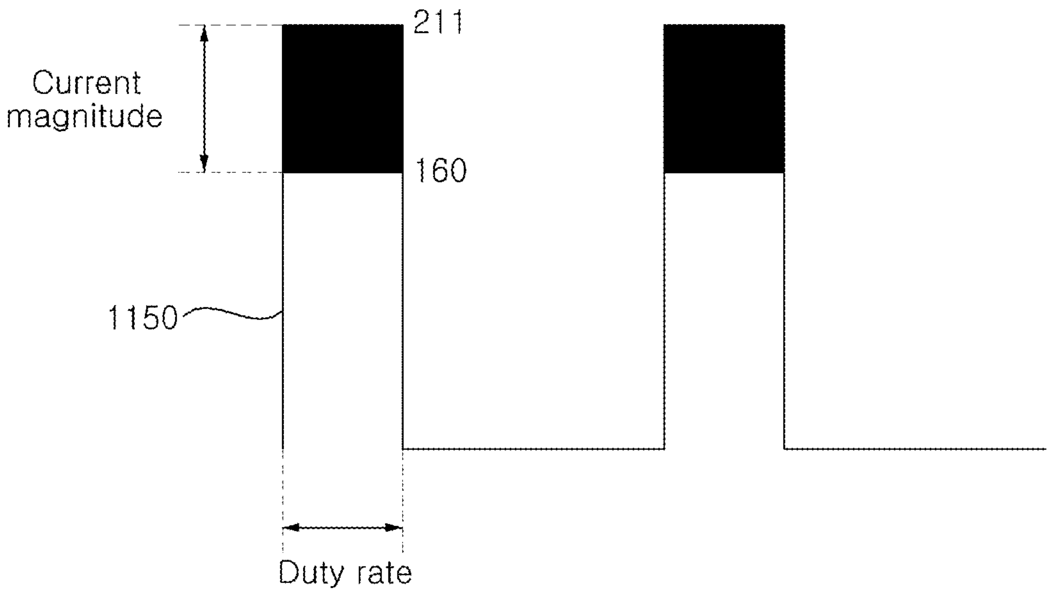

FIGS. 10 to 11D are flowcharts illustrating a process of controlling a backlight block based on a local dimming gain according to an embodiment of the present disclosure.

FIG. 10 is a diagram explaining step S705 in detail.

Referring to FIG. 10, the controller 170 may obtain local dimming correction data values for each of a plurality of local areas constituting the object area based on the local dimming gain (S1001).

The controller 170 may obtain a local dimming correction data value by multiplying the local dimming data value of the local area obtained in step S803 of FIG. 8 by the local dimming gain.

Referring to FIG. 11A, the entire area 1100 corresponding to the liquid crystal display panel 210 is shown. The entire area 1100 may include an object area 1110 including an object and a partial area 1130 included in the remaining areas other than the object area 1110.

The controller 170 may obtain local dimming data values of each local area constituting the object area 1110.

The controller 170 may obtain a local dimming correction data value based on the local dimming gain and the local dimming data value.

If the local dimming gain is 1.5, the controller 170 may obtain a local dimming correction data value for each local area of the object area 1110 as shown in FIG. 11B by multiplying the local dimming data value by 1.5.

The local dimming data value and the local dimming correction data value may be grayscale values.

The maximum grayscale value of the object area 1110 may be different from the maximum grayscale value other than the object area 1110. The maximum grayscale value of the object area 1110 may be greater than the maximum grayscale value of other areas than the object area 1110 due to local dimming gain.

The controller 170 may obtain the current magnitude ratio of each local area based on each local dimming data value (S1003).

The controller 170 may calculate the current magnitude ratio of each local area by subtracting 1023 from the local dimming correction data value and then dividing the value by 10. For example, if the local dimming correction data value is 1534, 511, which is the value obtained by subtracting 1023 from 1534, may be divided by 10 to obtain 51 (truncation of decimal point).

The controller 170 may obtain the current magnitude ratio of the local area 1112 as 51, as shown in FIG. 11C.

The controller 170 may obtain the final current magnitude ratio by adding the current magnitude ratio for the local area and the common current magnitude ratio.

For example, as shown in FIG. 11C, if the local current magnitude ratio of the local area 1112 included in the object area 1110 is 51 and the common current magnitude ratio is 160, the final current magnitude ratio is 211.

That is, the current magnitude ratio of the local area 1112 can be increased from the existing 160 to 211.

The controller 170 may obtain the current magnitude ratio for each local area of the object area 1110 in this manner.

The controller 170 may transmit a plurality of current magnitude ratios corresponding to each of a plurality of local areas included in the object area to the backlight 250 (S1005).

The controller 170 may transmit the increased current magnitude ratio to the backlight 250. The controller 170 may transmit a plurality of current magnitude ratios and a plurality of duty ratios corresponding to each of the plurality of local areas constituting the object area 1110 to the backlight 250.

A signal having an increased current magnitude ratio may be applied to each of the backlight blocks corresponding to each of the plurality of local areas.

The controller 170 may transmit a plurality of current magnitude ratios and a plurality of duty ratios corresponding to the remaining areas other than the object area 1110 to the backlight 250.

That is, the amplitude of the signal applied to the backlight block corresponding to the local area 1110 included in the object area 1110 is the amplitude of the signal applied to the backlight block corresponding to some area 1130 other than the object area 1110. It can be bigger than The light source driver 256 may generate a plurality of signals having a plurality of current magnitude ratios and a plurality of duty ratios corresponding to the object area 1110 received from the controller 170, and may transmit each of the plurality of generated signals to a to each backlight block corresponding to the local area.

FIG. 11D shows a signal 1150 applied to the backlight block corresponding to the local area 1112. The current magnitude ratio of the existing signal was maintained, but in an embodiment of the present disclosure, the current magnitude ratio of the signal may be increased from the existing 160 to 210.

The light source driver 256 may apply a signal with increased current magnitude ratio and duty ratio to the backlight block corresponding to the local area included in the object area.

As such, according to an embodiment of the present disclosure, the contrast ratio and three-dimensional effect of the object area can be improved by increasing the magnitude of the current applied to the backlight block corresponding to the object area.

Figure 12:
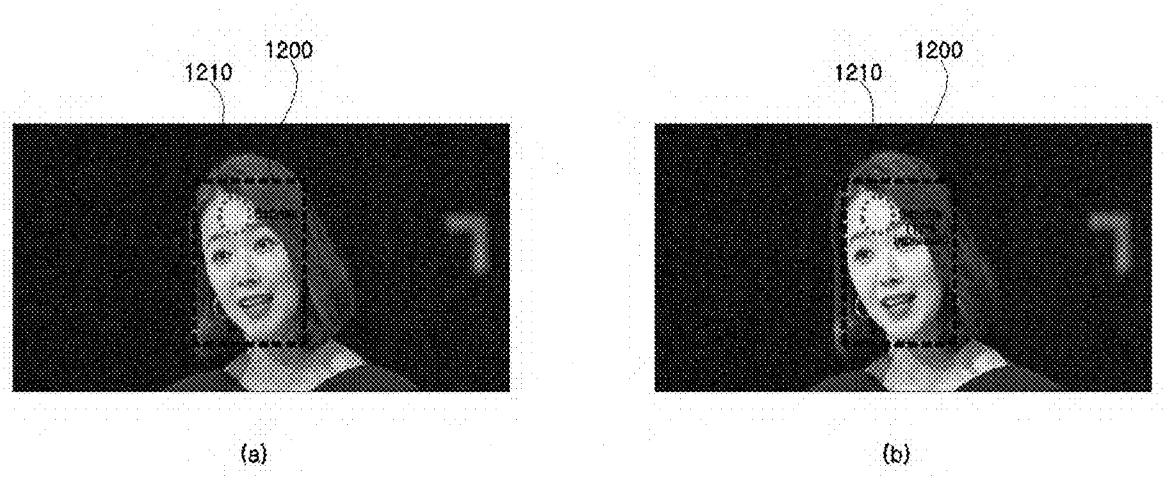
FIG. 12 is a diagram illustrating an example in which the luminance of an object area is increased according to the application of an embodiment of the present disclosure.

FIG. 12 is a diagram illustrating an example in which the luminance of an object area is increased according to the application of an embodiment of the present disclosure.

Referring to (a) and (b) of FIG. 12, an object area 1200 representing a person's face may be extracted from the input image.

The object area 1200 may have a rectangular shape.

As shown in (a) of FIG. 12, the luminance measured in the local area 1210 included in the object area 1200 according to the prior art is 810 nits, and as shown in (b) of FIG. 12, the luminance measured in the local area 1210 included in the object area 1200 according to the present disclosure is 945 nits, which is a 17% increase in luminance compared to the prior art.

That is, compared to the prior art, the luminance of the local area 1210 may increase as the ratio of the current applied to the backlight blocks corresponding to the local area 1210 increases. Accordingly, the contrast ratio and three-dimensional effect of the object area 1200 can be greatly improved, thereby increasing the viewer's sense of immersion in watching the video.

Whether or not to apply the embodiments of the present disclosure can be performed in the following manner.

1. A comparison image is created including an object area containing the object detected from the input image and a box area with a similar size to the detected object area. The box area does not contain any objects.
2. The APL of the box area is created similar to the APL of the detected object area.
3. Check the luminance outside the object area in the input image and the luminance outside the box area in the comparison image.
4. If there is a large difference between the luminance of the object area in the input image and the luminance of the box area in the comparison image, and the luminance difference in the remaining areas is similar, it may be determined that the embodiment of the present disclosure to apply the local dimming gain to the object area to increase the maximum grayscale value of the object area have been applied.

Figure 13:
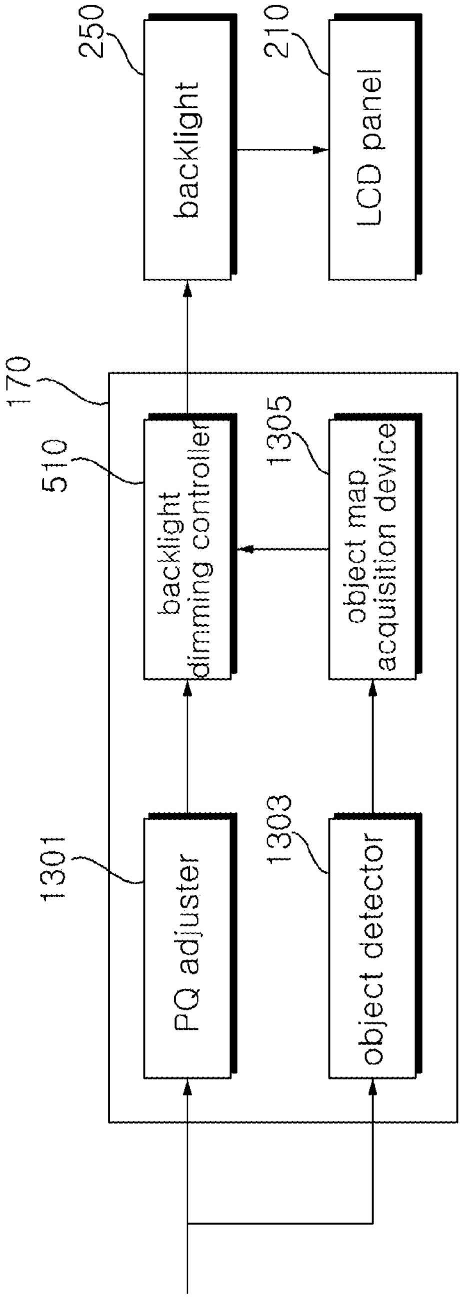
FIG. 13 is a diagram for explaining the configuration of a controller according to another embodiment of the present disclosure.

FIG. 13 is a diagram for explaining the configuration of a controller according to another embodiment of the present disclosure.

Referring to FIG. 13, the controller 170 may include a picture quality (PQ) adjuster 1301, an object detector 1303, an object map acquisition device 1305, and a backlight dimming controller 510.

The Picture Quality (PQ) controller 1301 may control picture quality elements of the input image. Image quality factors may include one or more of sharpness and contrast.

The picture quality adjuster 1301 may transmit image data of an input image with adjusted picture quality elements to the backlight dimming controller 510. Image data may be RGB data. RGB data may include R data applied to the R pixel, G data applied to the G pixel, and B data applied to the B pixel.

The object detector 1303 may detect an object from an input image. The object detector 1303 may extract an object from an input image using an object detection model learned through machine learning according to the method described in FIG. 7.

The object map acquisition device 1305 may obtain the location of the extracted object and the object area occupied by the object. The object area may be an area mapped to a plurality of panel blocks or a plurality of backlight blocks.

The object area may include multiple local areas. The object map acquisition device 1305 may acquire a plurality of local areas and the location (or coordinates) of each of the plurality of local areas.

The object map acquisition device 1305 may transmit the location of each of the plurality of local areas to the backlight dimming controller 510.

The backlight dimming controller 510 may obtain a local dimming gain corresponding to the object area. The backlight dimming controller 510 may obtain the APL data value of the object area and the average local dimming data value of the input image.

The backlight dimming controller 510 may obtain a local dimming gain based on the APL data value of the object area and the average local dimming data value of the input image.

For the process of obtaining local dimming gain, refer to step S805 of FIG. 8.

The backlight dimming controller 510 may obtain local dimming correction data values for each of a plurality of local areas constituting the object area based on the local dimming gain.

The backlight dimming controller 510 may obtain the current magnitude ratio of each local area based on each local dimming data value.

The backlight dimming controller 510 may calculate the current magnitude ratio of each local area by subtracting 1023 from the local dimming correction data value and dividing the value by 10. For example, if the local dimming correction data value is 1534, 511, which is the value obtained by subtracting 1023 from 1534, can be divided by 10 to obtain 51 (truncation of decimal point).

The backlight dimming controller 510 may obtain the current magnitude ratio for each local area of the object area 1110 in this manner. The backlight dimming controller 510 may obtain a duty ratio to be applied to each backlight block based on RGB data of the input image.

The backlight dimming controller 510 transmits the location of each of the plurality of local areas constituting the object area, the current magnitude ratio to be applied to the backlight block corresponding to each local area, and the duty ratio of each backlight block to the backlight 250.

The light source driver 256 may apply signal with increased current magnitude ratio and duty ratio to the backlight block corresponding to the local area included in the object area.

The light source 252 of the backlight 250 may irradiate light, the intensity and blinking period of which are adjusted by a signal applied from the light source driver 256, to the LCD panel 210.

In particular, stronger light than before is irradiated to the backlight blocks corresponding to the object area, thereby improving the contrast ratio and three-dimensional effect of the object area.

Meanwhile, the controller 170 may generate compensation data for image data (RGB data) to prevent a foggy phenomenon in which the object area becomes hazy due to an increase in luminance of the object area.

The controller 170 may set the pixel gain of the image data applied to the panel block in the local area to a lower value as the current magnitude ratio of the signal applied to the backlight in the local area included in the object area increases.

The present disclosure described above can be implemented as computer-readable code on a program-recorded medium. Computer-readable media includes all types of recording devices that store data that can be read by a computer system. Examples of computer-readable media include HDD (Hard Disk Drive), SSD (Solid State Disk), SDD (Silicon Disk Drive), ROM, RAM, CD-ROM, magnetic tape, floppy disk, and optical data storage devices. Additionally, the computer may include a controller 170 of the display device 100. Accordingly, the above detailed description should not be construed as restrictive in all respects and should be considered illustrative.

What is claimed is:

1. A display device, comprising:

a liquid crystal display (LCD) panel;

a backlight including a plurality of backlight blocks that provide light to the LCD panel, wherein each of the plurality of backlight blocks includes a plurality of LEDs; and a controller configured to:

extract an object area from an input image, obtain a local dimming gain to increase a luminance of the extracted object area, control a current applied to backlight blocks mapped to the object area based on the obtained local dimming gain, and control the current applied to the plurality of backlight blocks so that a maximum gray level value of the object area is greater than a maximum gray level value of remaining areas other than the object area by adjusting an amplitude and a width of a signal applied to the backlight blocks mapped to the object area based on the local dimming gain.

2. The display device of claim 1, wherein the controller is configured to obtain the local dimming gain based on an average picture level (APL) data value of the object area and an average local dimming data value that is an average of the local dimming data values of a plurality of areas constituting an entire area of the input image.

3. The display device of claim 2, further comprising a memory configured to store a local dimming gain table indicating a correspondence between the APL data value and the average local dimming data value, wherein the controller is configured to obtain the local dimming gain from the local dimming gain table.

4. The display device of claim 2, wherein the APL data value is a grayscale value based on 12 bits and the average local dimming data value is a grayscale value based on 10 bits.

5. The display device of claim 1, wherein the local dimming gain has a value greater than or equal to 1 and less than or equal to a certain limit value.

6. The display device of claim 1, wherein the controller is configured to extract the object area from the input image using an object detection model based on an artificial neural network learned through machine learning.

7. The display device of claim 1, wherein the controller is further configured to adjust a pixel gain of image data applied to a panel block corresponding to the object area.

8. A method of operating a display device including a liquid crystal display (LCD) panel and a backlight including a plurality of backlight blocks that provide light to the LCD panel, comprising:

extracting an object area from an input image, obtaining a local dimming gain to increase a luminance of the extracted object area;

controlling a current applied to backlight blocks mapped to the object area based on the obtained local dimming gain, and wherein the controlling comprises controlling the current applied to the plurality of backlight blocks so that a maximum gray level value of the object area is greater than a maximum gray level value of remaining areas other than the object area by adjusting an amplitude of a signal applied to the backlight blocks mapped to the object area and a width of the signal based on the local dimming gain.

9. The method of claim 8, wherein the obtaining the local dimming gain comprises obtaining the local dimming gain based on an average picture level (APL) data value of the object area and an average local dimming data value that is an average of the local dimming data values of a plurality of areas constituting an entire area of the input image.

10. The method of claim 9, further comprising:

storing a local dimming gain table indicating a correspondence between the APL data value and the average local dimming data value, wherein the obtaining the local dimming gain comprises obtaining the local dimming gain from the local dimming gain table.

11. The method of claim 9, wherein the APL data value is a grayscale value based on 12 bits and the average local dimming data value is a grayscale value based on 10 bits.

12. The method of claim 8, wherein the local dimming gain has a value greater than or equal to 1 and less than or equal to a certain limit value.

13. The method of claim 8, wherein the amplitude of the signal applied to the backlight blocks mapped to the object area is greater than an amplitude of the signal applied to the backlight blocks mapped to the remaining areas other than the object area.

14. The method of claim 8, wherein the extracting comprises extracting the object area from the input image using an artificial neural network-based object detection model learned through machine learning.

15. The method of claim 8, further comprising:

adjusting a pixel gain of the image data applied to a panel block corresponding to the object area.

16. A display device, comprising:

a liquid crystal display (LCD) panel;

a backlight including a plurality of backlight blocks that provide light to the LCD panel, wherein each of the plurality of backlight blocks includes a plurality of LEDs; and a controller configured to:

extract an object area from an input image, obtain a local dimming gain to increase a luminance of the extracted object area, control a current applied to backlight blocks mapped to the object area based on the obtained local dimming gain, and control the current applied to the plurality of backlight blocks by adjusting an amplitude of a signal applied to the backlight blocks mapped to the object area to be greater than an amplitude of a signal applied to the backlight blocks mapped to remaining areas, such that a maximum gray level value of the object area is greater than a maximum gray level value of the remaining areas.

* * * * *